(12) United States Patent
Friedlander et al.

(10) Patent No.: US 9,037,720 B2
(45) Date of Patent: May 19, 2015

(54) TEMPLATE FOR OPTIMIZING IT INFRASTRUCTURE CONFIGURATION

(75) Inventors: Robert R. Friedlander, Southbury, CT (US); James R. Kraemer, Santa Fe, NM (US)

(73) Assignee: International Business Machines Corporation, Armonk, NY (US)

(*) Notice: Subject to any disclaimer, the term of this patent is extended or adjusted under 35 U.S.C. 154(b) by 1113 days.

(21) Appl. No.: 12/949,956

(22) Filed: Nov. 19, 2010

(65) Prior Publication Data
US 2012/0131468 A1   May 24, 2012

(51) Int. Cl.
G06F 15/173 (2006.01)
H04L 12/24 (2006.01)

(52) U.S. Cl.
CPC .................. H04L 41/0836 (2013.01)

(58) Field of Classification Search
None
See application file for complete search history.

(56) References Cited

U.S. PATENT DOCUMENTS

| | | | |
|---|---|---|---|
| 5,784,539 A * | 7/1998 | Lenz | 706/45 |
| 6,067,545 A * | 5/2000 | Wolff | 1/1 |
| 7,135,956 B2 | 11/2006 | Bartone et al. | |
| 7,296,256 B2 * | 11/2007 | Liu et al. | 717/104 |
| 2002/0107864 A1 | 8/2002 | Battas et al. | |
| 2002/0107957 A1 | 8/2002 | Zargham et al. | |
| 2002/0138643 A1 * | 9/2002 | Shin et al. | 709/232 |
| 2002/0198751 A1 * | 12/2002 | Ernest et al. | 705/7 |
| 2003/0074401 A1 | 4/2003 | Connell et al. | |
| 2004/0210445 A1 | 10/2004 | Veronese et al. | |
| 2004/0221038 A1 * | 11/2004 | Clarke et al. | 709/226 |
| 2005/0096949 A1 | 5/2005 | Aiber et al. | |
| 2005/0222931 A1 * | 10/2005 | Mamou et al. | 705/35 |
| 2006/0092903 A1 * | 5/2006 | Tayloe et al. | 370/342 |
| 2006/0129745 A1 * | 6/2006 | Thiel et al. | 711/100 |
| 2006/0161444 A1 * | 7/2006 | Lubrecht et al. | 705/1 |
| 2006/0174037 A1 | 8/2006 | Bernardi et al. | |
| 2007/0038648 A1 | 2/2007 | Chetwood et al. | |
| 2007/0061191 A1 | 3/2007 | Mehrotra et al. | |
| 2007/0100930 A1 | 5/2007 | Moon et al. | |
| 2007/0192406 A1 | 8/2007 | Frietsch et al. | |
| 2007/0250829 A1 * | 10/2007 | Hillier et al. | 717/170 |
| 2008/0040364 A1 * | 2/2008 | Li | 707/100 |
| 2008/0052719 A1 * | 2/2008 | Briscoe et al. | 718/104 |
| 2008/0077530 A1 * | 3/2008 | Banas et al. | 705/50 |

(Continued)

OTHER PUBLICATIONS

U.S. Appl. No. 12/835,259—Non-Final Office Action Mailed Mar. 1, 2012.

(Continued)

*Primary Examiner* — Gurkanwaljit Singh
(74) *Attorney, Agent, or Firm* — Law Office of Jim Boice

(57) ABSTRACT

A computer implemented method, system, and/or computer program product provides hierarchical templates to optimize a configuration of an information technology (IT) infrastructure. A technology rule set, which defines technology weights of an IT infrastructure by mapping capabilities of IT infrastructure components to IT infrastructure attributes needed to execute a specific workload, is established. Hierarchical templates, which are tied to configuration logic for creating IT infrastructures, are sent to a user. Based on user-selected templates, a candidate IT infrastructure for executing the specific workload is configured. In response to determining that the candidate IT infrastructure fails to meet the customer's expectations, the candidate IT infrastructure is reconfigured until the customer's expectations are met.

19 Claims, 7 Drawing Sheets

(56) References Cited

U.S. PATENT DOCUMENTS

| | | | |
|---|---|---|---|
| 2008/0120129 A1* | 5/2008 | Seubert et al. | 705/1 |
| 2008/0127133 A1 | 5/2008 | Aghara et al. | |
| 2008/0270205 A1* | 10/2008 | Kumar et al. | 705/7 |
| 2008/0301783 A1 | 12/2008 | Abrutyn et al. | |
| 2008/0312979 A1 | 12/2008 | Lee et al. | |
| 2009/0006850 A1 | 1/2009 | Birger et al. | |
| 2009/0018882 A1* | 1/2009 | Burton et al. | 705/7 |
| 2009/0150472 A1* | 6/2009 | Devarakonda et al. | 709/201 |
| 2009/0307174 A1 | 12/2009 | Devarakonda et al. | |
| 2009/0307508 A1 | 12/2009 | Curtis et al. | |
| 2009/0313631 A1 | 12/2009 | De Marzo et al. | |
| 2010/0017244 A1* | 1/2010 | Saha et al. | 705/8 |
| 2010/0017782 A1 | 1/2010 | Chaar et al. | |
| 2010/0070291 A1* | 3/2010 | Handy | 705/1.1 |
| 2010/0274596 A1* | 10/2010 | Grace et al. | 705/7 |
| 2011/0126099 A1 | 5/2011 | Anderson et al. | |
| 2012/0016715 A1 | 1/2012 | Brown et al. | |

OTHER PUBLICATIONS

H. Fujimaki et al., "Fujitsu's Primergy BX620 S4 Blade Server for Solving Server Consolidation Problems", Fujitsu Ltd., Fujitsu Scientific and Technical Journal, vol. 44, No. 1, pp. 19-26, Jan. 2008.

V. Frei, "Which Styleguides IT Companies Regulate", IKS E. V., Sprache Und Datenverarbeitung, vol. 32, No. 2, pp. 27-51, 2008.

Ptak, Noel & Associates, "Optimize Resources and Services to Meet Business Goals", pp. 1-4, 2005.

IBM, "IT Optimization to Meet Business Goals", IBM, pp. 1-5, Jan. 2007.

IBM Global Services, "IT Optimization: Driving Infrastructure Value", IBM Global Services, pp. 1-4, 2005.

A. Gillen et al., "Optimizing Infrastructure: the Relationship Between IT Labor Costs and Best Practices for Managing the Windows Desktop", IDC, pp. 1-4, 2006.

A. Lachenmann et al., "Meeting Lifetime Goals With Energy Levels", Sensys'07, ACM, pp. 131-144, Nov. 2007.

* cited by examiner

IT QUERY WEBPAGE

File  Edit  View  Tools  Help

DOES THE CUSTOMER HAVE MORE THAN 50 EMPLOYEES?  YES  NO

DOES THE CUSTOMER WORK WITH CONFIDENTIAL PATIENT INFORMATION?  YES  NO

DOES THE CUSTOMER OPERATE WITHIN STATE X?  YES  NO

TEMPLATE FOR OPTIMIZING IT INFRASTRUCTURE CONFIGURATION

RELATED APPLICATIONS

The present invention is related to U.S. patent application Ser. No. 12/835,259, entitled "Optimizing IT Infrastructure Configuration", which is assigned to the same assignee, and incorporated herein by reference.

BACKGROUND

The present disclosure relates to the field of computers, and specifically to the configuration of computers and computer systems. Still more particularly, the present disclosure relates to optimizing computer system configurations to meet both workload requirements and customer preferences.

BRIEF SUMMARY

A computer implemented method, system, and/or computer program product provides hierarchical templates to optimize a configuration of an information technology (IT) infrastructure. A technology rule set, which defines technology weights of an IT infrastructure by mapping capabilities of IT infrastructure components to IT infrastructure attributes needed to execute a specific workload, is established. Hierarchical templates, which are tied to configuration logic for creating IT infrastructures, are sent to a user. Based on user-selected templates, a candidate IT infrastructure for executing the specific workload is configured. In response to determining that the candidate IT infrastructure fails to meet the customer's expectations, the candidate IT infrastructure is reconfigured until the customer's expectations are met.

BRIEF DESCRIPTION OF THE SEVERAL VIEWS OF THE DRAWINGS

FIG. 6 depicts a UI query webpage that can be used to automatically fine tune an IT infrastructure.

DETAILED DESCRIPTION

Figure 1:
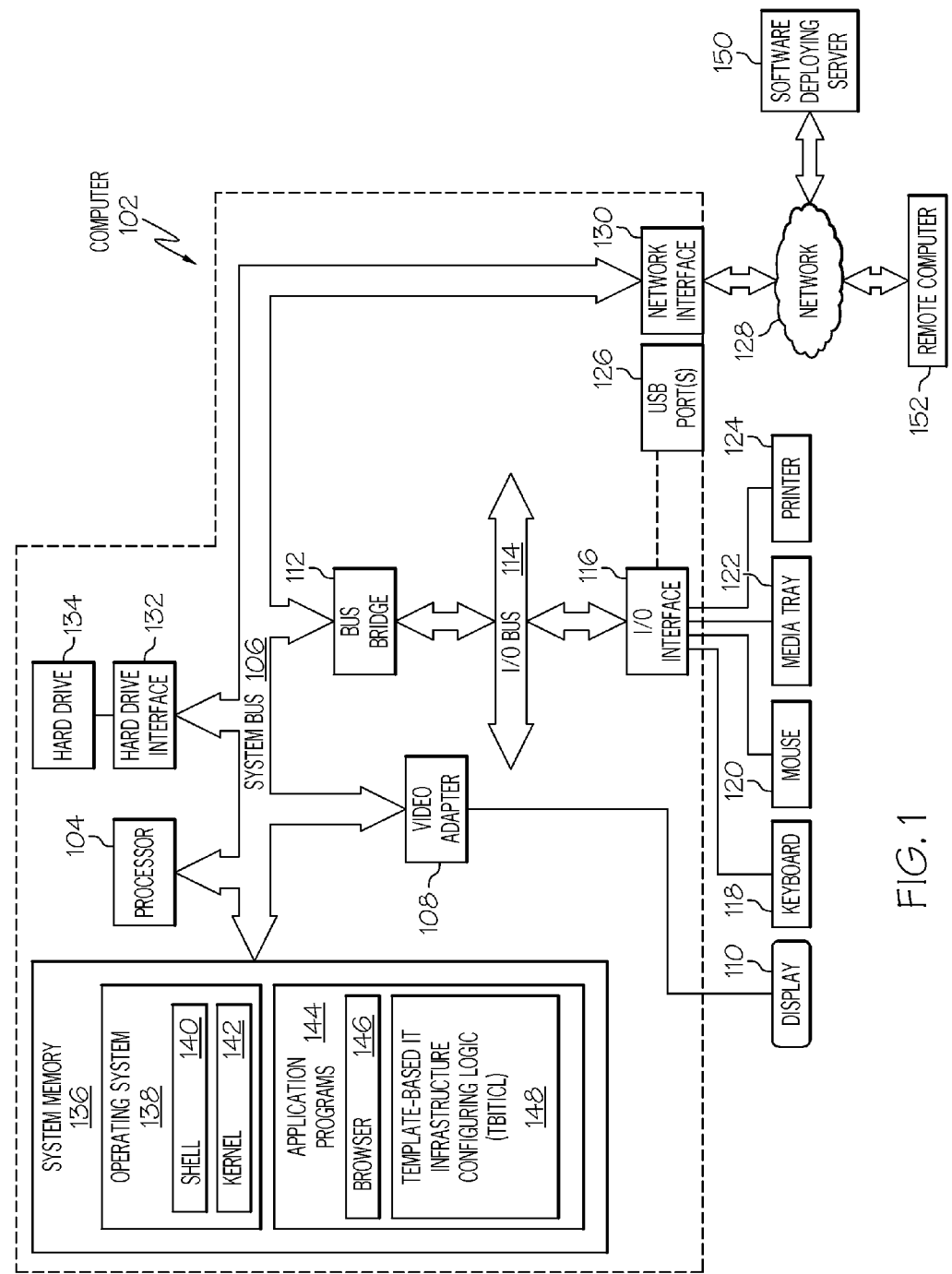
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or remote computer 152.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 and/or remote computer 152 using a network interface 130 to network 128. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory and/or remote computer 152's system memory) also include a template-based information technology infrastructure configuring logic (TBITICL) 148. TBITICL 148 includes code for implementing the processes described below, including those described in FIGS. 2-7. In one embodiment, computer 102 is able to download TBITICL 148 from software deploying server 150, including in an on-demand basis, wherein the code in TBITICL 148 is not downloaded until needed for execution to define and/or implement the improved enterprise architecture described herein. Note further that, in one embodiment of the present invention, software deploying server 150 performs all of the functions associated with the present invention (including execution of TBITICL 148), thus freeing computer 102 from having to use its own internal computing resources to execute TBITICL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from TBITICL 148 causes VHDL program 139 to configure VHDL chip 137, which may be an FPGA, ASIC, etc.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
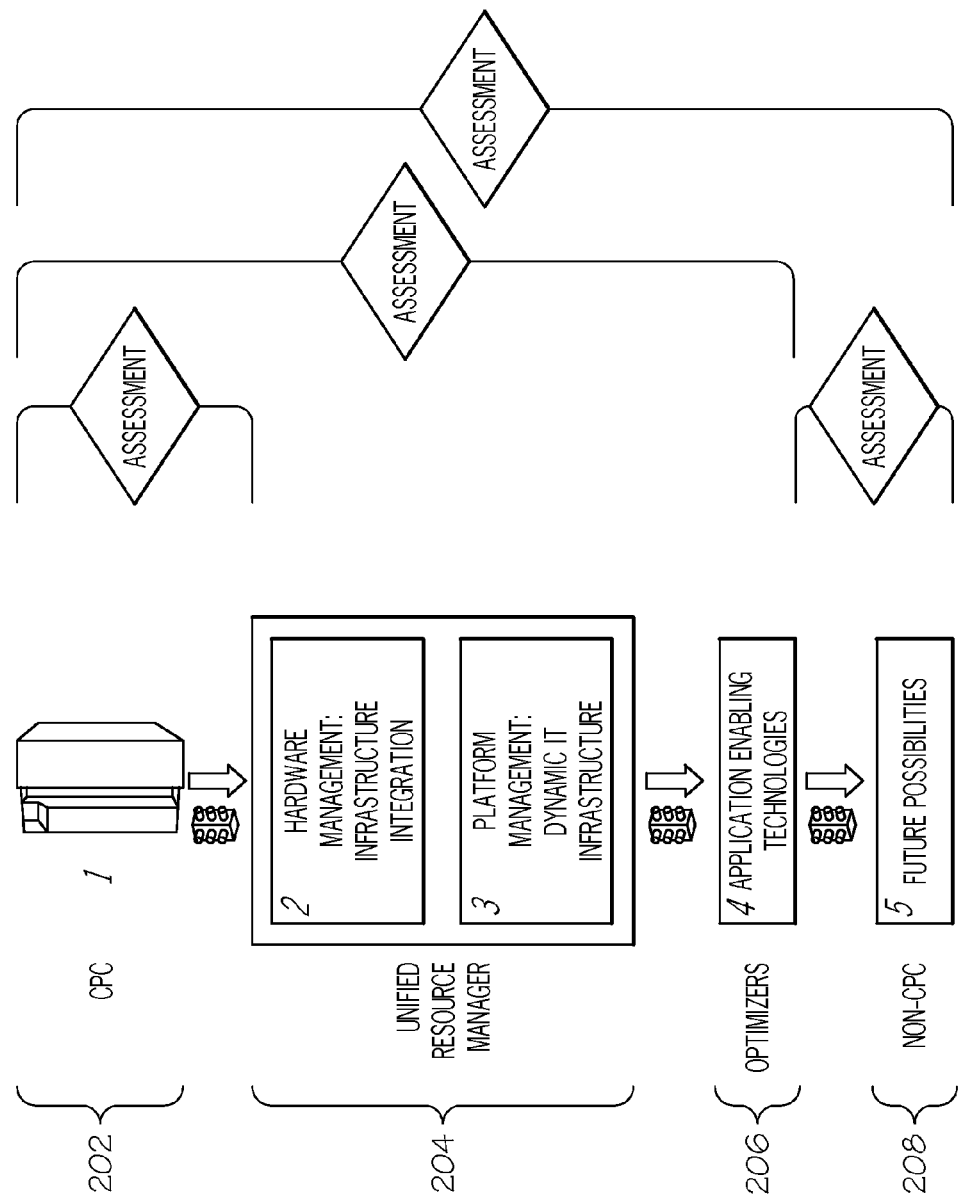
FIG. 2 depicts an exemplary high-level flow for configuring/optimizing an IT infrastructure.

With reference now to FIG. 2, an exemplary high-level flow for configuring/optimizing an IT infrastructure is presented. A first step 1 includes assessing an existing or proposed central processing complex (CPC) 202. CPC 202 denotes an architecture configuration attached through a channel subsystem to a set of devices or other architecture configurations. In one embodiment, CPC 202 comprises loosely coupled complexes where each CPC is an architecture configuration that can include multiple instruction-stream engines and a set of shared or unshared devices such as tapes and modules. This assessment determines the need and/or feasibility of increasing workload performance, expanding workload capacity, extending system reliability, availability, and serviceability (RAS), and improving system efficiency. Once these parameters/needs are established, then an evaluation of a unified resource manager 204 can be performed (steps 2 and 3). As depicted in step 2, assessing the hardware management function of the unified resource manager 204 comprises evaluating multi-system provisioning/management of physical resources and virtual resources, multi-system monitoring, control and serviceability management, and multi-system energy monitoring, control and management. As represented by step 3, assessing the platform management comprises multi-architecture virtual server management, workload-based monitoring and reporting, and performance management. As represented by step 4, application enabling technologies can be assessed using optimizers 206. This assessment comprises evaluating integrated support for business intelligence (e.g., service oriented architecture services). That is, in step 4 the IT infrastructure created in steps 1-3 is optimized in accordance with specific needs of a particular client, as described in greater detail below in FIGS. 4-7. Finally, as depicted in step 5, non-CPC issues can be evaluated for future configurations/needs. This assessment comprises evaluating multi-system storage virtualization management, business continuity and resiliency controls, capacity upgrade on demand; capacity backup, energy management, image management, virtual server mobility and relocation, standards-based enterprise management application program interfaces, multi-architecture workload distribution and mobility, availability management, and business continuity.

Figure 3:
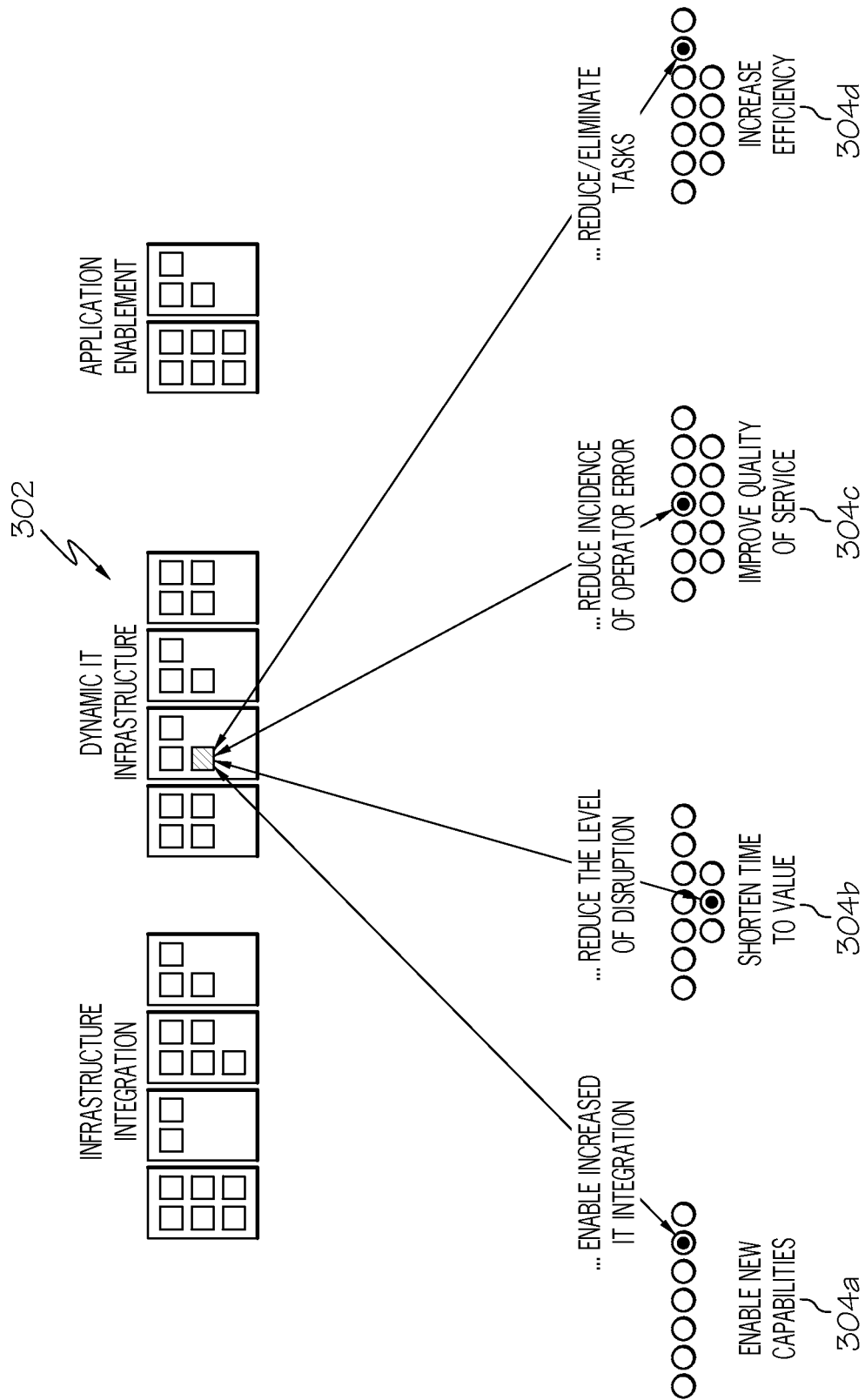
FIG. 3 illustrates a mapping of IT infrastructure components to customer-weighted attributes of an IT infrastructure.

In one embodiment, the assessments described in FIG. 2 are supported by mapping technology to attributes of an existing or proposed IT infrastructure. With reference now to FIG. 3, an exemplary mapping of IT infrastructure components to customer-weighted attributes of an IT infrastructure is presented. Components of an IT infrastructure 302 are mapped to specific attributes associated with the parameters shown in FIG. 2. That is, components of IT infrastructure 302 are now mapped to customer-weighted attributes 304*a-d* that were described above in graph 202 of FIG. 2. For example, a management module in the proposed IT infrastructure may be deemed to have the effect of enabling increased IT integration (part of attribute 304*a*), reducing the level of disruption caused by power failures (part of attribute 304*b*), reducing the incidence of operator errors (part of attribute 304*c*), and reducing/eliminating tasks associated with a specific workload (part of attribute 304*d*). These mappings provide a configuration tool with the ability to measure how many of these types of links (shown in FIG. 3) apply to a particular workload, and how strongly. In one embodiment, this initial mapping is industry-wide. That is, this initial mapping establishes a technology rule set. This technology rule set defines technology weights of an IT infrastructure by mapping capabilities of IT infrastructure components (302) to IT infrastructure attributes (304*a-d*) needed to execute a specific workload.

The process and system described in FIGS. 2-3 can be considered the "back end" of the present disclosure. That is, a dynamic IT infrastructure can be implemented or modified using configuration process of FIG. 2 along with the mapping system shown in FIG. 3. In order to execute the assessment/configuration of this back end system, the present disclosure presents hierarchical templates to a user, such as a sales representative of an IT system provider.

Figure 4:
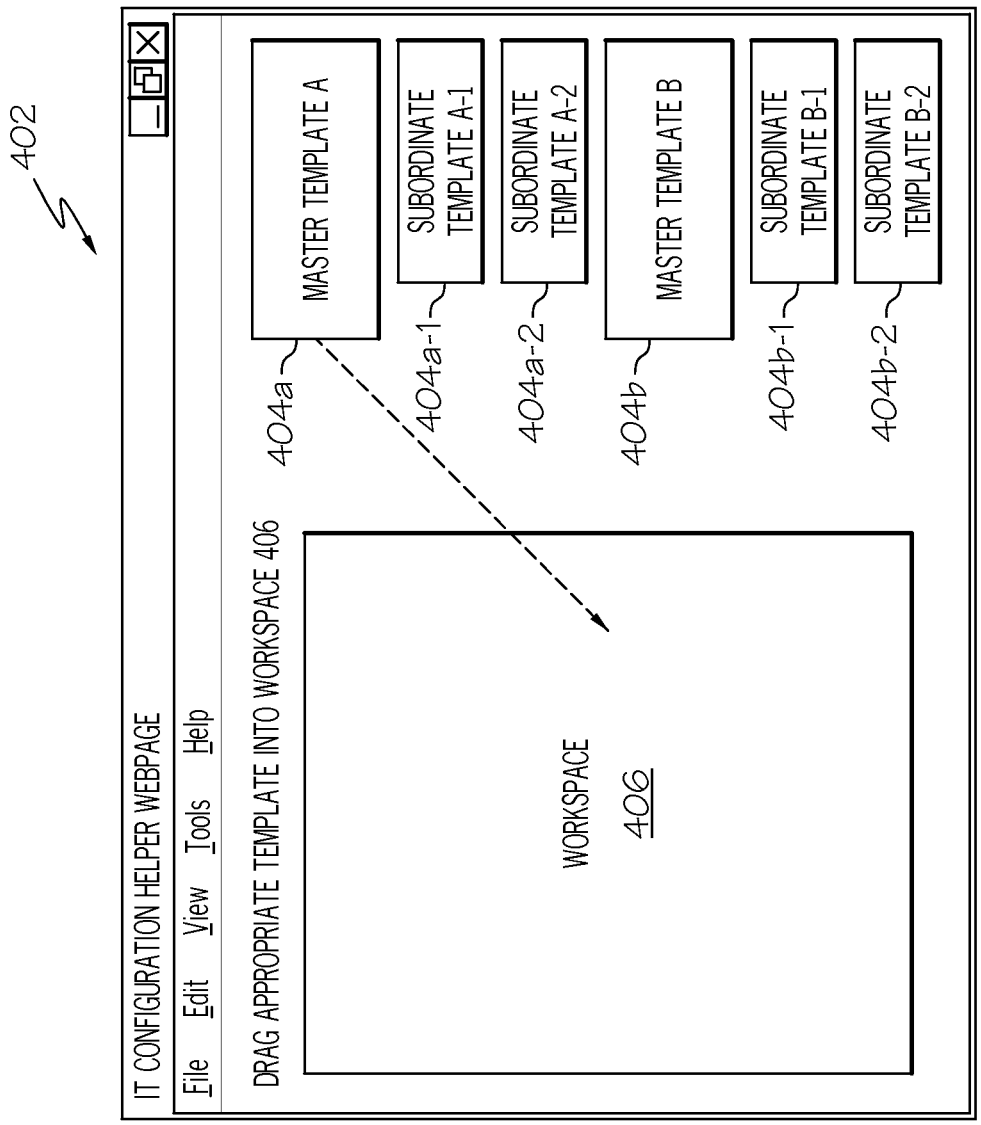
FIG. 4 depicts an exemplary user interface (UI) for using hierarchical templates to configure an IT infrastructure.

For example, consider the user interface (UI) 402 shown in FIG. 4. UI 402, which may be a webpage or similar page sent to a remote computer (e.g., remote computer 152 shown in FIG. 1) from a server (e.g., computer 102 shown in FIG. 1), comprises multiple hierarchical templates. This hierarchy includes a master template (e.g., master templates 404*a-b*) and subordinate templates (e.g., subordinate templates 404*a*-1-2 and 404*b*-1-2). A master template is defined as a template that describes a broad IT architecture, while the subordinate templates are templates that provide additional capability/structure/constraints to the IT configuration that is defined by the master template.

For example, assume that a user is a sales representative for an IT system provider. While meeting with the client/customer, the sales representative knows that this customer is a hospital. The sales representative knows from a program guide that Master Template A (404*a*) is a template for a generic IT system used by a hospital. However, not all hospitals are alike. For example, some are large, some are small, some have multiple locations, some are multi-state and/or multi-national, some have personnel that are multi-lingual, some specialize in particular diseases and/or treatments thereof, some are subject to certain United States legal requirements (e.g., Health Insurance Portability and Accountability Act—HIPAA), some are research hospitals that must follow research protocols such as Institutional Review Board (IRB) ethics reviews, some must meet specific accessibility requirements (e.g., Section 508 of the U.S. Rehabilitation Act), etc.

In accordance with one embodiment of the present disclosure, Master Template A is tied to the unified resource manager described in element 204 in FIG. 2 above, while subordinate templates are tied to optimizers described in element 206 in FIG. 2. Thus, by continuing with the hospital example, Master Template A is associated with logic (e.g., all part of TBITICL 148 depicted in FIG. 1) that assesses how to optimally implement an IT infrastructure, as described in FIGS. 2-3. Subordinate templates A-1 and/or A-2 are tied to the logic associated with executing the optimizers in element 208 in FIG. 2. Thus, selecting subordinate template A-1 (404*a*-1) may result in the generic hospital IT system being modified to make it HIPAA compliant (i.e., creates the appropriate security firewalls, etc. needed to ensure patient confidentiality). Other subordinate templates (e.g., 404*a*-2) are also hierarchically related to the master template (404*a*), since they also modify the IT infrastructure defined by Master Template A (404*a*). One or more of these subordinate templates thus modify the generic hospital IT infrastructure in order to accommodate the needs of a hospital that is of a particular size (i.e., number of personnel/beds/departments), has multiple locations, is multi-state and/or multi-national, has personnel that are multi-lingual, specializes in particular diseases and/or treatments thereof, is subject to certain United States legal requirements (e.g., HIPAA), must follow research protocols such as IRB ethics reviews, must meet specific accessibility requirements, etc.

As depicted in FIG. 4, another Master Template B (404*b*) may also be available for selection by the user. In one embodiment, Master Template B is for use with a non-hospital customer, such as a manufacturer. As with the hospital example above, a generic manufacturing IT infrastructure is configured based on Master Template B. This generic manufacturing IT infrastructure is then fine tuned using the subordinate templates B-1 and/or 2.

Figure 5:
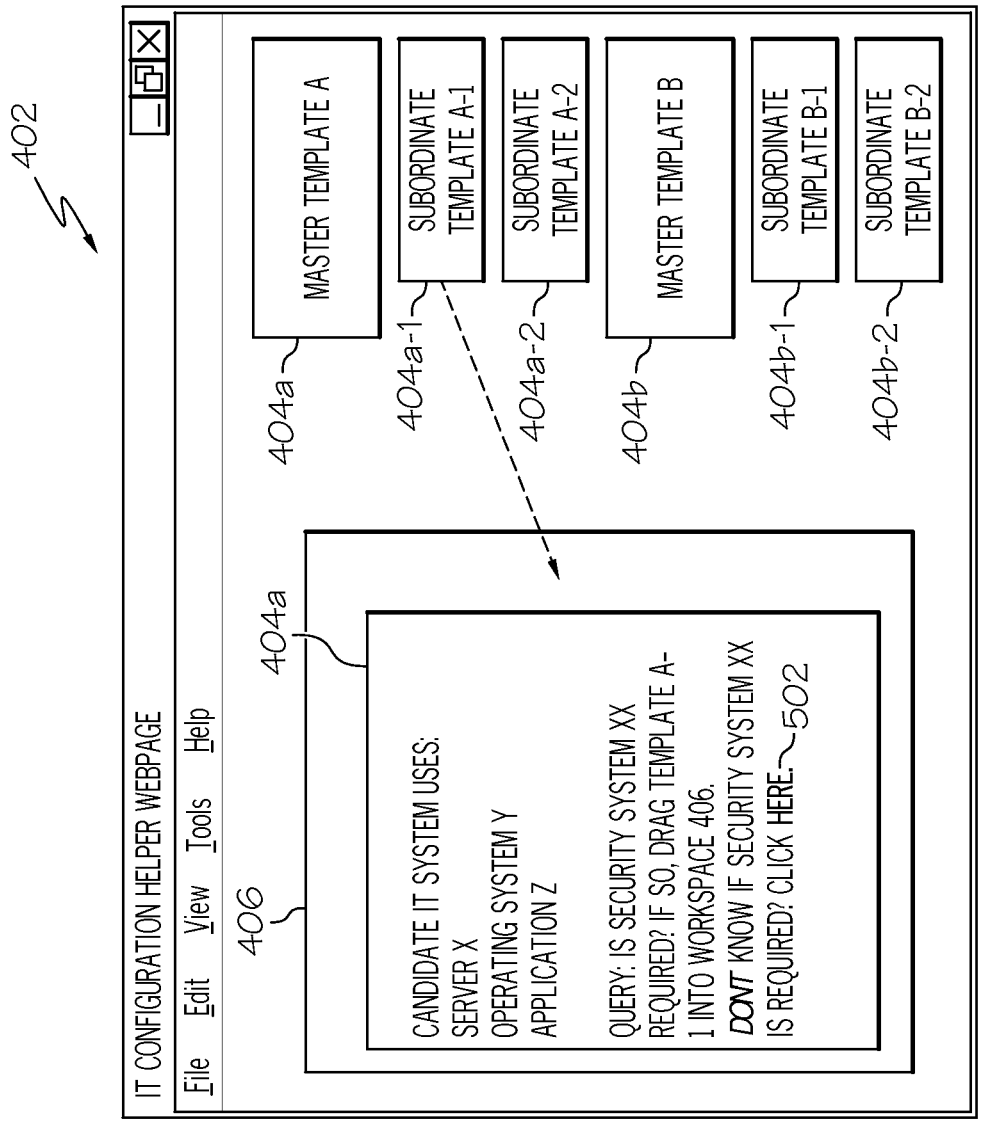
FIG. 5 illustrates the UI in FIG. 4 with additional interactive questions to a user of the UI.

Assume for exemplary purposes that the sales representative of the IT system provider has dragged Master Template A (404*a*) into workspace 406. This results in TBITICL 148, implementing the processes described in FIGS. 2-3, creating a candidate IT system that uses Server X, Operating System (OS) Y, on which is run Application Z. If the sales representative knows that a particular security system XX (i.e., a configuration that is HIPAA-compliant) will be needed by the customer, then dragging subordinate template A-1 (404a-1) will result in TBITICL 148 implementing the processes described in FIGS. 2-3 (and particularly those associated with step 4 in FIG. 2), as depicted in FIG. 5 to provide such security to the candidate IT system. However, the sales representative may not be sure if security system XX (associated with subordinate template A-1) is needed, or if it is the right modification to the generic hospital IT infrastructure created by Master Template A. In this case, the sales representative will click the hyperlink 502, which brings up UI 602 shown in FIG. 6. By clicking certain combinations of the "YES" and "NO" buttons, the appropriate subordinate template is activated (put into workspace 406 and/or incorporated into the design of the IT infrastructure). For example, clicking "YES" for all three questions in UI 602 may result in the implementation of subordinate template 404a-1, while clicking "YES" on the first two questions but "NO" on the third question may result in the implementation of subordinate template 404a-2. Thus, the sales representative is guided through a series of questions in order to locate the appropriate subordinate template for use with a particular master template for the IT system.

Figure 7:
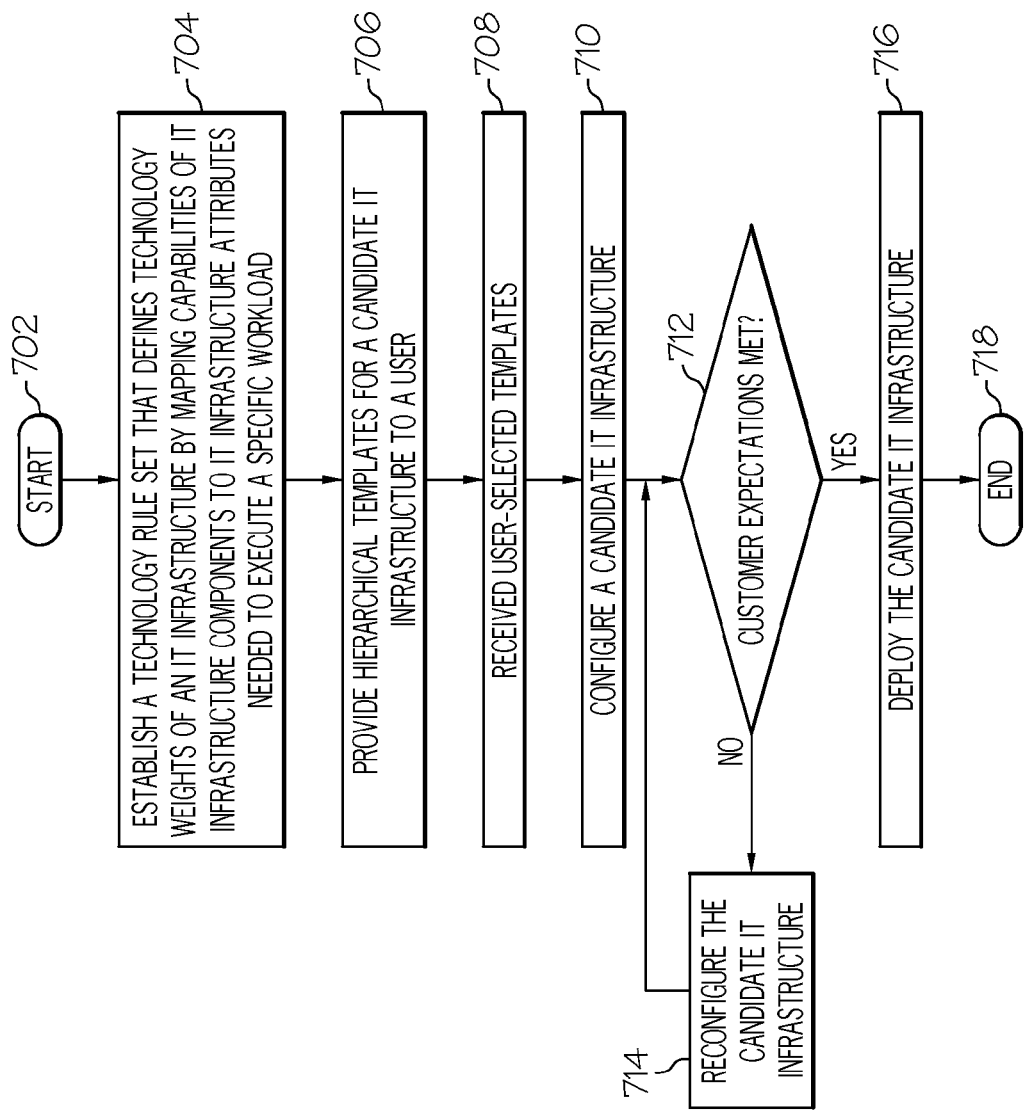
FIG. 7 is a high level flow chart of one or more exemplary steps taken by a processor to configure and/or optimize an IT infrastructure using hierarchical templates.

Referring now to FIG. 7, a high level flow chart of one or more exemplary steps taken by a processor to configure and/or optimize an IT system is presented. After initiator block 702, a technology rule set is established (block 704). This technology rule set defines technology weights of an IT infrastructure by mapping capabilities of IT infrastructure components to IT infrastructure attributes needed to execute a specific workload (e.g., as described in FIG. 3). These weights and capabilities are assigned to a candidate IT infrastructure that is associated with a particular Master Template (e.g., element 404a shown in FIG. 4).

Note that, even before a candidate IT infrastructure is modified using subordinate templates as described above, the candidate IT infrastructure can be optimized/configured in various ways. For example, the candidate IT infrastructure can be configured to minimize power consumption and to comply with external regulations during execution of the specific workload.

In one embodiment, the candidate IT infrastructure can be configured by modifying an existing IT infrastructure. In this embodiment, a request for needed IT components is issued. These needed IT components are part of the candidate IT infrastructure but are absent from the existing IT infrastructure. An order can then be issued to remove unnecessary IT components that are part of the existing IT infrastructure but are not part of the candidate IT infrastructure.

In one embodiment, the candidate IT infrastructure is configured by first fixing the specific workload to a set definition, and then adjusting a configuration of the candidate IT infrastructure until the candidate IT infrastructure is capable of executing the specific workload. In this embodiment, the workload is deemed the most important factor. In another embodiment, however, the IT infrastructure may be deemed more important (e.g., if workloads change). In this case, the candidate IT infrastructure is configured by first fixing an initial IT infrastructure configuration to a set definition, and then adjusting the specific workload until the initial IT infrastructure configuration is capable of executing the adjusted workload.

In one embodiment, the candidate IT infrastructure is configured by subdividing the candidate IT infrastructure across multiple IT providers until the candidate IT infrastructure is capable of executing the specific workload. In this embodiment, it is assumed that a single IT provider will not be able to optimally provide all of the necessary components to meet the needs of the customer. Thus, components of the candidate IT infrastructure are subdivided out until a level of granularity is reached to ensure that the optimal subcomponents are used in the IT infrastructure.

In one embodiment, the candidate IT infrastructure is configured by discarding existing IT resources from an existing IT infrastructure that do not meet the IT infrastructure attributes needed to execute the specific workload, thus resulting in an optimized and simpler IT infrastructure.

As depicted in block 706, hierarchical templates (as described above) are then sent to a user. The user selects a master and/or subordinate template for a particular industry/customer, and returns them to the server (block 708). A candidate IT infrastructure, which is a candidate IT infrastructure that matches the features described in the master and/or subordinate template(s), is then configured (block 710). If the candidate IT infrastructure created by/based on the user-selected master and/or subordinate template(s) fails to meet the customer's expectations (query block 712), then the candidate IT infrastructure is reconfigured (block 714) until the customer's expectations are met. These customer expectations can be from responses to a questionnaire, based on two-way conversations between the IT provider and the sales representative, etc. Once the customer's expectations are met, the candidate IT infrastructure can be deployed (block 716), and the process ends (terminator block 718).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of optimizing a configuration of an information technology (IT) infrastructure, the computer implemented method comprising:
    establishing a technology rule set, wherein the technology rule set defines technology weights of an IT infrastructure by mapping capabilities of IT infrastructure components to IT infrastructure attributes needed to execute a specific workload;
    providing hierarchical templates for a candidate IT infrastructure to a user, wherein the hierarchical templates comprise a master template and a subordinate template used to deploy an IT infrastructure, wherein the subordinate template provides additional capability, structure, and constraints to an IT configuration that is defined by the master template;
    a processor, in response to receiving user-selected templates from the master template and the subordinate template, configuring a candidate IT infrastructure for executing the specific workload;
    in response to determining that the candidate IT infrastructure fails to meet expectations of the user, reconfiguring the candidate IT infrastructure to meet the expectations of the user in executing the specific workload;
    presenting a candidate subordinate template to a user on a user interface;
    receiving an electronic query signal from the user, wherein the electronic query signal indicates that the user is unsure whether the candidate subordinate template should be incorporated into the master template;
    providing a questionnaire to the user on the user interface, wherein the questionnaire includes a set of predetermined questions that are designed to automatically determine whether the candidate subordinate template executes the specific workload;
    receiving responses to the questionnaire from the user; and
    in response to receiving responses that have been predetermined to be appropriate responses for incorporating the candidate subordinate template into the master template, incorporating the candidate subordinate template into the master template.

2. The computer implemented method of claim 1, further comprising:
    in response to the processor determining that the candidate IT infrastructure meets the customer's expectations, deploying the candidate IT infrastructure.

3. The computer implemented method of claim 1, further comprising:
    optimizing the candidate IT infrastructure to minimize power consumption and to comply with external regulations during execution of the specific workload.

4. The computer implemented method of claim 1, further comprising:
    configuring the candidate IT infrastructure by modifying an existing IT infrastructure, wherein modifying the existing IT infrastructure is performed by:
        issuing a request for needed IT components, wherein the needed IT components are part of the candidate IT infrastructure but are absent from the existing IT infrastructure; and
        issuing an order to remove unnecessary IT components, wherein the unnecessary IT components are part of the existing IT infrastructure but are not part of the candidate IT infrastructure.

5. The computer implemented method of claim 1, further comprising:
    configuring the candidate IT infrastructure by:
        fixing the specific workload to a set definition; and
        adjusting a configuration of the candidate IT infrastructure until the candidate IT infrastructure is capable of executing the specific workload.

6. The computer implemented method of claim 1, further comprising:
    configuring the candidate IT infrastructure by:
        fixing an initial IT infrastructure configuration to a set definition; and
        adjusting the specific workload until the initial IT infrastructure configuration is capable of executing the adjusted workload.

7. The computer implemented method of claim 1, further comprising:
    configuring the candidate IT infrastructure by:
        subdividing the candidate IT infrastructure across multiple IT providers until the candidate IT infrastructure is capable of executing the specific workload.

8. The computer implemented method of claim 1, further comprising:
    configuring the candidate IT infrastructure by discarding existing IT resources, from an existing IT infrastructure, that do not meet the IT infrastructure attributes needed to execute the specific workload.

9. The computer implemented method of claim 1, further comprising:
    configuring the subordinate template to deploy an IT infrastructure that complies with a predetermined legal requirement.

10. A computer program product for optimizing a configuration of an information technology (IT) infrastructure, the computer program product comprising:
    a non-transitory computer readable storage media;
    first program instructions to establish a technology rule set, wherein the technology rule set defines technology weights of an IT infrastructure by mapping capabilities of IT infrastructure components to IT infrastructure attributes needed to execute a specific workload;
    second program instructions to provide hierarchical templates for a candidate IT infrastructure to a user, wherein the hierarchical templates comprise a master template and a subordinate template used to deploy an IT infrastructure, wherein the subordinate template provides additional capability, structure, and constraints to an IT configuration that is defined by the master template;
    third program instructions to, in response to receiving user-selected templates from the master template and the subordinate template, configure a candidate IT infrastructure for executing the specific workload; and
    fourth program instructions to, in response to determining that the candidate IT infrastructure fails to meet expectations of the user, reconfigure the candidate IT infrastructure to meet the expectations of the user in executing the specific workload;

fifth program instructions to present a candidate subordinate template to a user on a user interface;

sixth program instructions to receive an electronic query signal from the user, wherein the electronic query signal indicates that the user is unsure whether the candidate subordinate template should be incorporated into the master template;

seventh program instructions to provide a questionnaire to the user on the user interface, wherein the questionnaire includes a set of predetermined questions that are designed to automatically determine whether the candidate subordinate template executes the specific workload;

eighth program instructions to receive responses to the questionnaire from the user; and ninth program instructions to, in response to receiving responses that have been predetermined to be appropriate responses for incorporating the candidate subordinate template into the master template, incorporate the candidate subordinate template into the master template; and wherein the first, second, third, fourth, fifth, sixth, seven, eighth, and ninth program instructions are stored on the non-transitory computer readable storage media.

11. The computer program product of claim 10, further comprising:

tenth program instructions to, in response to determining that the candidate IT infrastructure meets the customer's expectations, deploy the candidate IT infrastructure, and wherein the tenth program instructions are stored on the non-transitory computer readable storage media.

12. The computer program product of claim 10, further comprising:

tenth program instructions to provide a questionnaire to the user, wherein the questionnaire includes a set of predetermined questions that are designed to automatically determine what additional configuration requirements are needed to execute the specific workload, and wherein the tenth program instructions are stored on the non-transitory computer readable storage media.

13. The computer program product of claim 10, further comprising:

tenth program instructions to optimize the candidate IT infrastructure to minimize power consumption and to comply with external regulations during execution of the specific workload, and wherein the tenth program instructions are stored on the non-transitory computer readable storage media.

14. The computer program product of claim 10, further comprising:

tenth program instructions to configure the subordinate template to deploy an IT infrastructure that complies with a predetermined legal requirement, and wherein the tenth program instructions are stored on the non-transitory computer readable storage media.

15. A computer system comprising:

a processor, a computer readable memory, and a non-transitory computer readable storage media;

first program instructions to establish a technology rule set, wherein the technology rule set defines technology weights of an IT infrastructure by mapping capabilities of IT infrastructure components to IT infrastructure attributes needed to execute a specific workload, wherein said mapping supports:

assessing hardware components of the infrastructure, assessing provisioning of hardware components of a unified resource manager that manages the infrastructure, and assessing performance of the unified resource manager;

second program instructions to provide hierarchical templates for a candidate IT infrastructure to a user, wherein the hierarchical templates comprise a master template and a subordinate template used to deploy an IT infrastructure, wherein the subordinate template provides additional capability, structure, and constraints to an IT configuration that is defined by the master template;

third program instructions to, in response to receiving user-selected templates from the master template and the subordinate template, configure a candidate IT infrastructure for executing the specific workload; and fourth program instructions to, in response to determining that the candidate IT infrastructure fails to meet expectations of the user, reconfigure the candidate IT infrastructure to meet the expectations of the user in executing the specific workload;

fifth program instructions to present a candidate subordinate template to a user on a user interface;

sixth program instructions to receive an electronic query signal from the user, wherein the electronic query signal indicates that the user is unsure whether the candidate subordinate template should be incorporated into the master template;

seventh program instructions to provide a questionnaire to the user on the user interface, wherein the questionnaire includes a set of predetermined questions that are designed to automatically determine whether the candidate subordinate template executes the specific workload;

eighth program instructions to receive responses to the questionnaire from the user; and ninth program instructions to, in response to receiving responses that have been predetermined to be appropriate responses for incorporating the candidate subordinate template into the master template, incorporate the candidate subordinate template into the master template;

and wherein the first, second, third, fourth, fifth, sixth, seventh, eighth, and ninth program instructions are stored on the computer readable storage media for execution by the processor via the non-transitory computer readable memory.

16. The computer system of claim 15, further comprising:

tenth program instructions to, in response to determining that the candidate IT infrastructure meets the customer's expectations, deploy the candidate IT infrastructure, and wherein the tenth program instructions are stored on the non-transitory computer readable storage media for execution by the processor via the computer readable memory.

17. The computer system of claim 15, further comprising:

tenth program instructions to provide a questionnaire to the user, wherein the questionnaire includes a set of predetermined questions that are designed to automatically determine what additional configuration requirements are needed to execute the specific workload, and wherein the tenth program instructions are stored on the non-transitory computer readable storage media for execution by the processor via the computer readable memory.

18. The computer system of claim 15, further comprising:

tenth program instructions to optimize the candidate IT infrastructure to minimize power consumption and to comply with external regulations during execution of the specific workload, and wherein the tenth program instructions are stored on the non-transitory computer readable storage media for execution by the processor via the computer readable memory.

19. The computer system of claim 15, further comprising: tenth program instructions to configure the subordinate template to deploy an IT infrastructure that complies with a predetermined legal requirement, and wherein the tenth program instructions are stored on the non-transitory computer readable storage media for execution by the processor via the computer readable memory.

* * * * *